United States Patent
Gregory (10) Patent No.: US 7,648,025 B1
(45) Date of Patent: Jan. 19, 2010

(54) ARROW AND BOW STORAGE AND TRANSPORTATION APPARATUS

(76) Inventor: Lyndell G. Gregory, 1921 Garner Rd., Yadkinville, NC (US) 27055

( * ) Notice: Subject to any disclaimer, the term of this patent is extended or adjusted under 35 U.S.C. 154(b) by 0 days.

(21) Appl. No.: 12/101,136

(22) Filed: Apr. 10, 2008

(51) Int. Cl.
*B65D 85/00* (2006.01)
*B60R 7/00* (2006.01)

(52) U.S. Cl. .................. 206/315.11; 224/404; 224/916

(58) Field of Classification Search .............. 206/315.1, 206/315.11, 317, 501, 523, 579; 420/4.26, 420/4.27, 23.8, 23.83, 23.86, 480, 482, 500, 420/505, 523, 525, 476; 224/404, 441, 545, 224/919; 296/37.6
See application file for complete search history.

(56) References Cited

U.S. PATENT DOCUMENTS

| | | | | |
|---|---|---|---|---|
| 3,088,583 | A | | 5/1963 | Holtz |
| 4,957,229 | A | * | 9/1990 | Freeman ...................... 224/405 |
| 5,249,722 | A | * | 10/1993 | Horn .......................... 224/403 |
| D343,057 | S | | 1/1994 | Dickinson |
| 5,299,722 | A | * | 4/1994 | Cheney ....................... 224/404 |
| 5,358,108 | A | | 10/1994 | Celaya |
| 5,415,255 | A | * | 5/1995 | Hafner ........................ 190/21 |
| 5,441,134 | A | * | 8/1995 | Carson ........................ 190/111 |
| 5,640,944 | A | * | 6/1997 | Minneman ..................... 124/1 |
| 5,641,106 | A | * | 6/1997 | Slaughter et al. ............ 224/324 |
| 5,881,874 | A | * | 3/1999 | McKinney ............. 206/315.11 |
| 5,967,392 | A | * | 10/1999 | Niemi et al. ................. 224/404 |
| 6,199,734 | B1 | * | 3/2001 | Meeks ......................... 224/401 |
| 6,464,277 | B2 | * | 10/2002 | Wilding ..................... 296/37.6 |
| 6,722,496 | B2 | * | 4/2004 | Gantert .................. 206/315.11 |
| 7,004,365 | B2 | * | 2/2006 | Ingram ....................... 224/401 |
| 7,104,402 | B2 | * | 9/2006 | Whalen et al. .............. 206/579 |
| 2006/0102669 | A1 | * | 5/2006 | Fouts et al. ................. 224/404 |

\* cited by examiner

*Primary Examiner*—Stephen Garbe
*Assistant Examiner*—Dene Quest (57) ABSTRACT

An arrow and bow storage and transportation apparatus includes a lower housing that has a bottom wall and a peripheral wall. The peripheral wall has an upper edge defining an opening into the interior. A first cover is hingedly coupled to the peripheral wall and positionable over the opening in a closed position. A perimeter wall is attached to and extends upwardly from the first cover. The first cover and the perimeter wall define an upper housing. The perimeter wall has a top edge defining an aperture into an interior of the upper housing. A second cover is hingedly coupled to the perimeter wall. The second cover is positionable in a closed position extending over the aperture or an open position exposing the aperture. A plurality of arrows is removably positioned in the upper housing and a bow is removably positioned in the lower housing.

8 Claims, 7 Drawing Sheets

ARROW AND BOW STORAGE AND TRANSPORTATION APPARATUS

BACKGROUND OF THE INVENTION

1. Field of the Invention

The present invention relates to bow storage devices and more particularly pertains to a new bow storage device for storing and transporting a plurality of arrows and a bow.

2. Description of the Prior Art

The use of bow storage devices is known in the prior art. While these devices fulfill their respective, particular objectives and requirements, the need remains for a device that can be used to store and transport a plurality of arrows and a bow in a manner that ensures that the bow and the arrows are undamaged during the storage and transportation thereof.

SUMMARY OF THE INVENTION

The present invention meets the needs presented above by generally comprising a lower housing that has a bottom wall and a peripheral wall that is attached to and extends upwardly from the bottom wall. The lower housing has an interior having a size configured to receive a bow. The peripheral wall has an upper edge defining an opening into the interior. A first cover is hingedly coupled to the peripheral wall. The first cover is positionable in a closed position extending over the opening or an open position exposing the opening. A perimeter wall is attached to and extends upwardly from the first cover. The first cover and the perimeter wall define an upper housing. The perimeter wall has a top edge defining an aperture into an interior of the upper housing. A second cover is hingedly coupled to the perimeter wall. The second cover is positionable in a closed position extending over the aperture or an open position exposing the aperture. A plurality of arrows is removably positioned in the upper housing and a bow is removably positioned in the lower housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 8 thereof, a new bow storage device embodying the principles and concepts of the present invention and generally designated by the reference numeral 10 will be described.

As best illustrated in FIGS. 1 through 8, the arrow and bow storage and transportation apparatus 10 generally comprises a lower housing 12 that has a bottom wall 14 and a peripheral wall 16 that is attached to and extends upwardly from the bottom wall 14. The lower housing 12 has an interior 18 having a size configured to receive a bow 20. The peripheral wall 16 has an upper edge 22 defining an opening 24 into the interior 18. The lower housing 12 has a width from a first lateral side 26 to a second lateral side 28 between 54 inches and 57 inches. The lower housing 12 has a height between 19 inches and 22 inches and a depth between 4½ inches and 6 inches.

A first cover 30 is hingedly coupled to the peripheral wall 16. The first cover 30 is positionable in a closed position extending over the opening 24 or an open position exposing the opening 24. Pistons 31 mounted within the lower housing 12 act as shock absorbers to prevent the first cover 30 from closing with enough force which could damage the bow 20 in side of the lower housing 12.

A perimeter wall 32 is attached to and extends upwardly from the first cover 30. The first cover 30 and the perimeter wall 32 define an upper housing 34. The perimeter wall 32 has a top edge 36 defining an aperture 38 into an interior 40 of the upper housing 34. The upper housing 34 has a height from the first cover 30 to the top edge 36 less than 7 inches. A second cover 42 is hingedly coupled to the perimeter wall 32. The second cover 42 is positionable in a closed position extending over the aperture 38 or an open position exposing the aperture 38.

A first lining 44 is positioned in the lower housing 12 and covers the bottom wall 14 and the peripheral wall 16. A second lining 46 is positioned in the upper housing 34 and covers the first cover 30 and the perimeter wall 32. The first 44 and second 46 linings are each comprised of a resiliently compressible material.

A first lock 48 is mounted on the first cover 30 and releasably locks the first cover 30 in the closed position. A second lock 50 is mounted on the second cover 42 and releasably locks the second cover 42 in the closed position. The first 48 and second 50 locks are conventional locks.

A pair of supports 52 is positioned within the lower housing 12 and extends between a front wall 54 and a back wall 56 of the lower housing 12. The supports 52 are spaced from each other and spaced from the bottom wall 14. Each of the supports 52 has an angled upper surface 58. The upper surfaces 58 are angled downwardly and toward each other to form a saddle. The bow 20 is supported by the supports 52 when the bow 20 is positioned in the lower housing 12. A cushioning material 60 is positioned on each of the supports 52.

Figure 1:
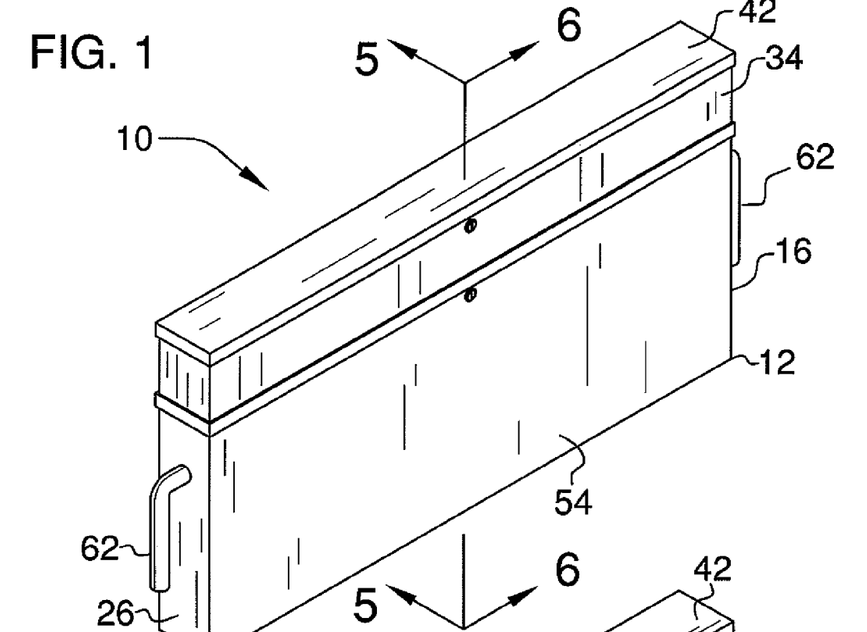
FIG. 1 is a front perspective view of an arrow and bow storage and transportation apparatus according to the present invention.
Figure 2:
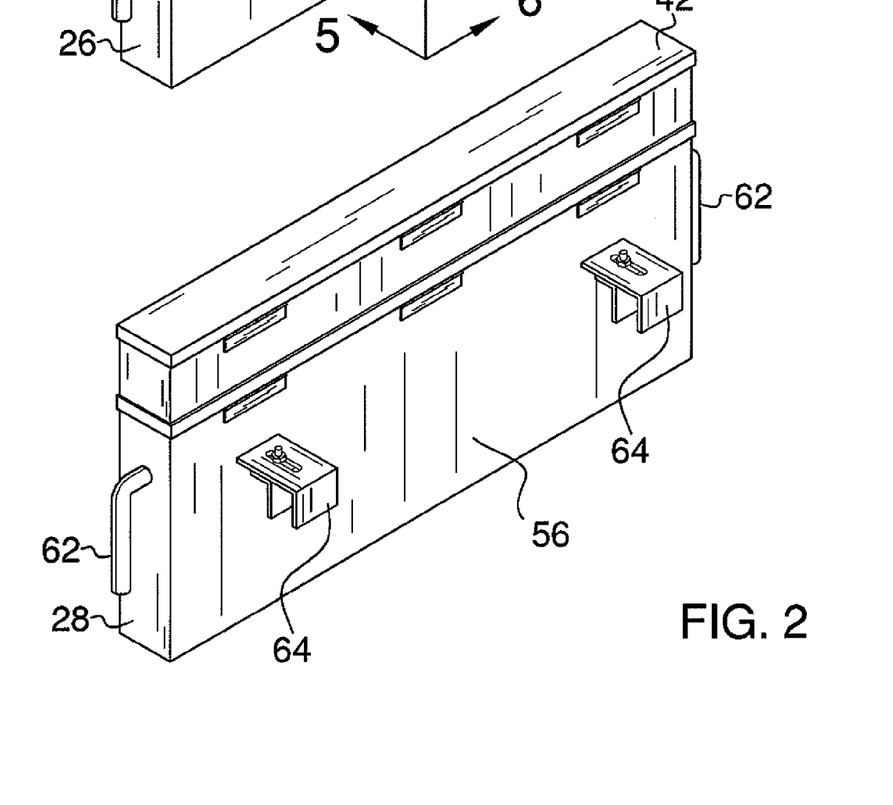
FIG. 2 is a back perspective view of the present invention.
Figure 3:
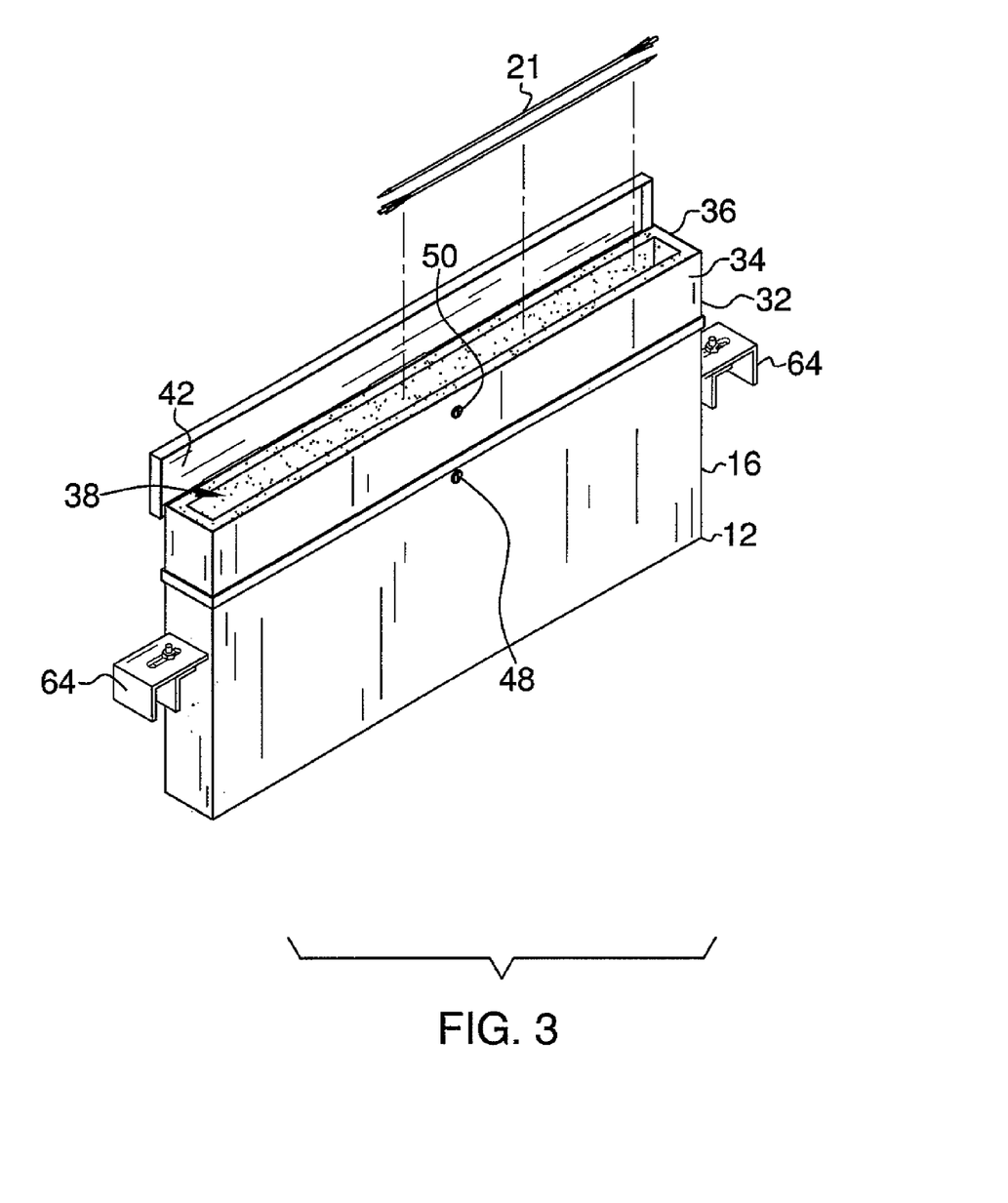
FIG. 3 is a front perspective view of the present invention showing alternate forms of brackets.
Figure 4:
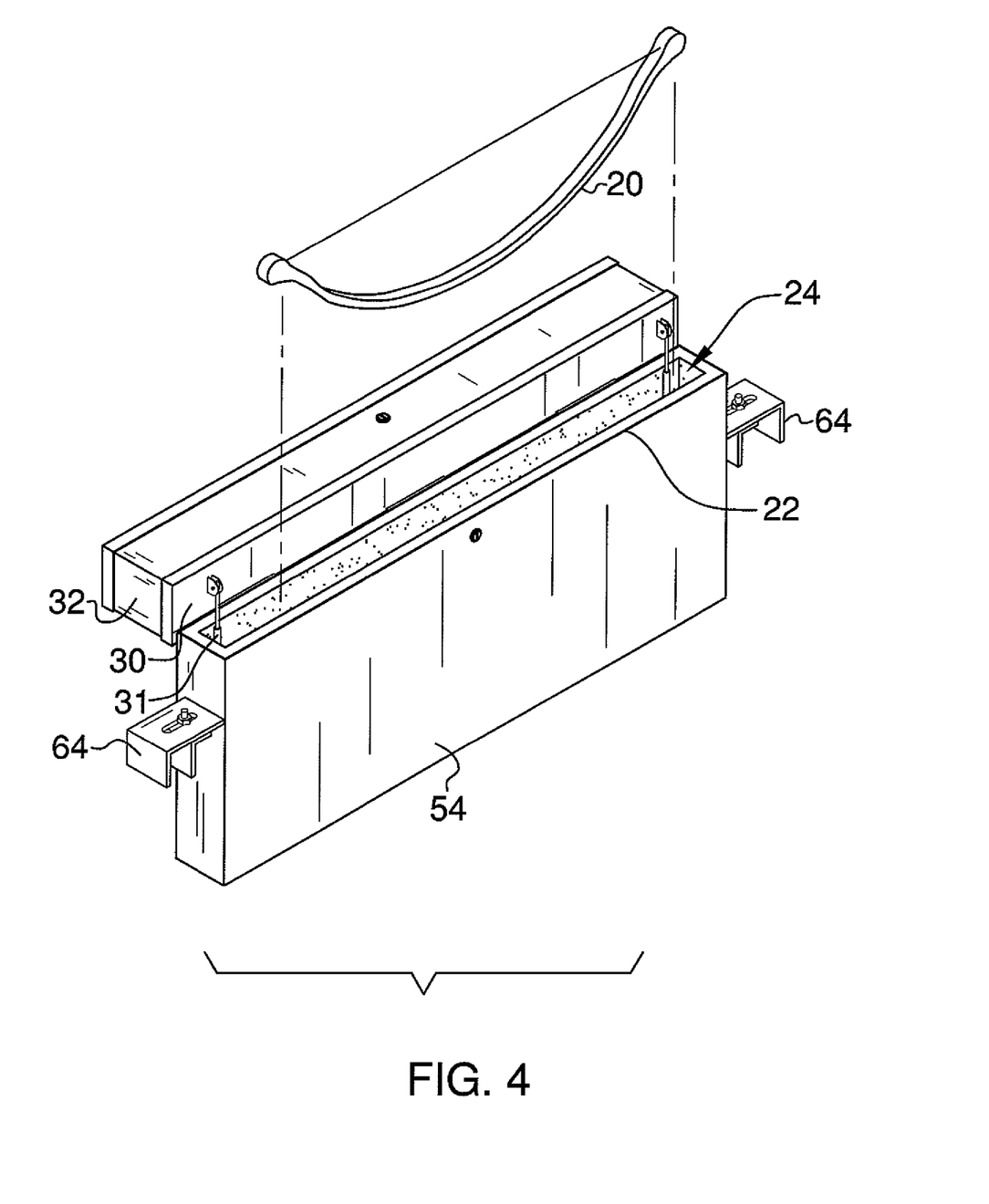
FIG. 4 is a front perspective view of the present invention showing alternate forms of brackets.
Figure 5:
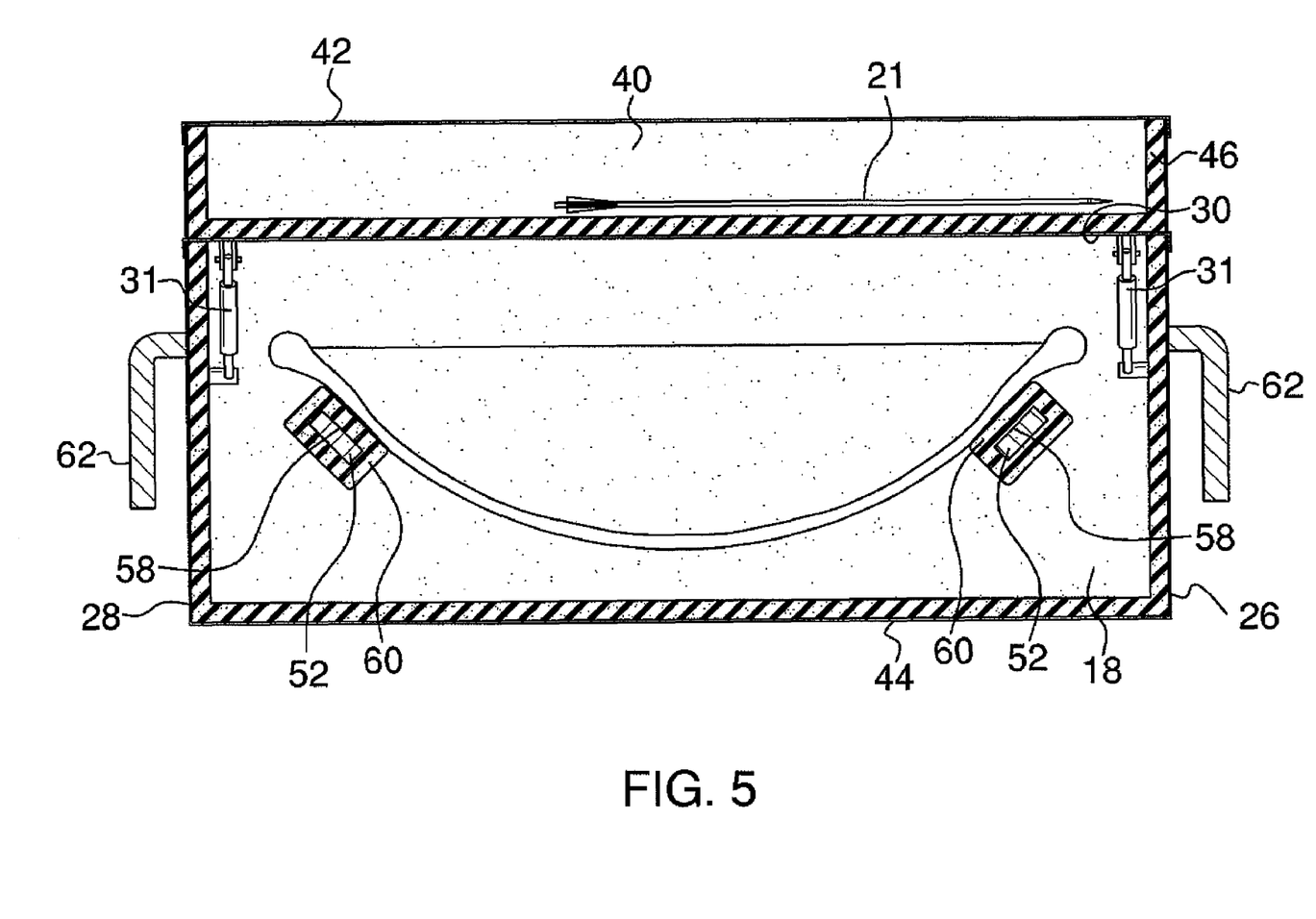
FIG. 5 is a cross-sectional view taken along line 5-5 of FIG. 1 of the present invention.
Figure 6:
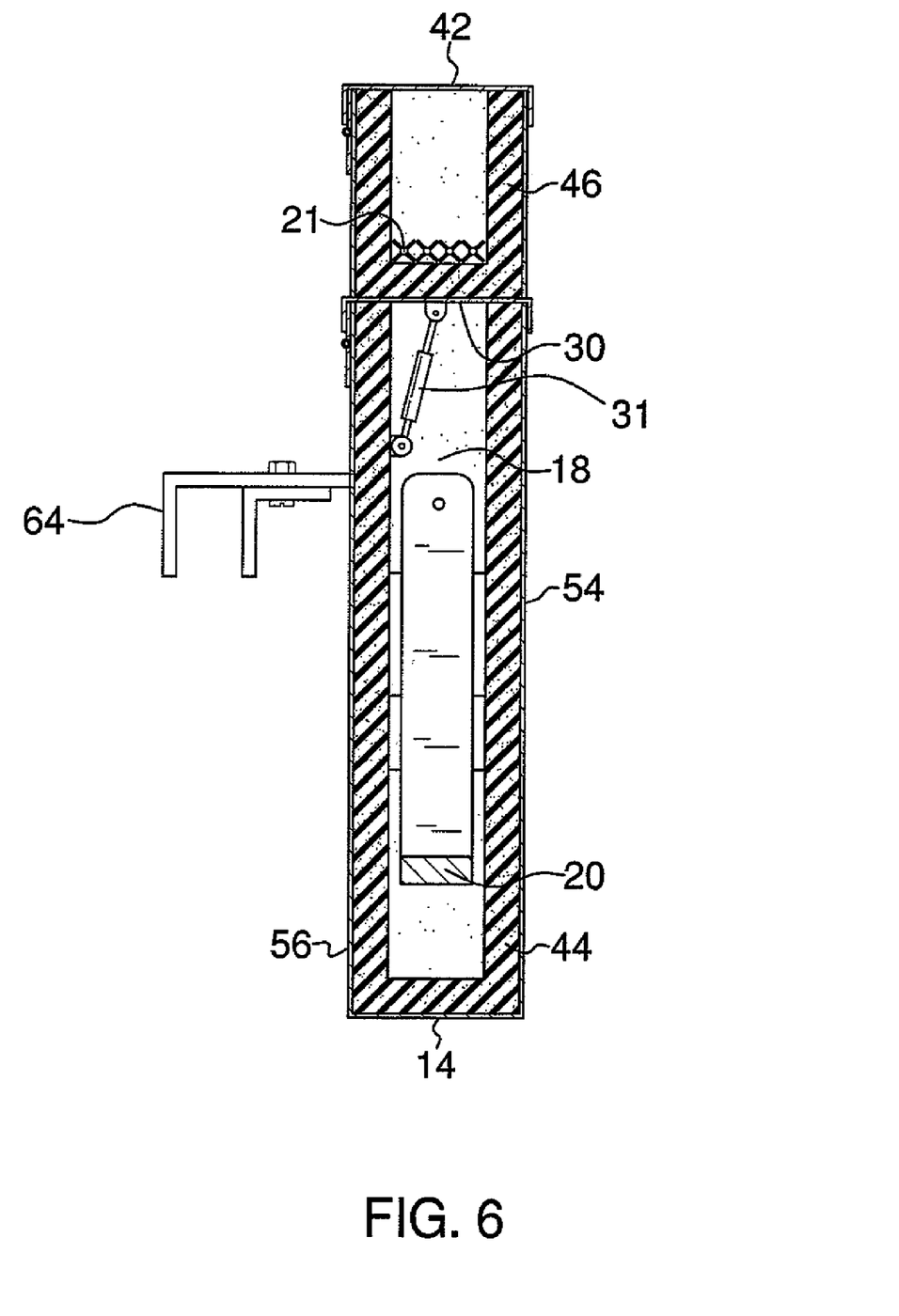
FIG. 6 is a cross-sectional view taken along line 6-6 of FIG. 1 of the present invention.
Figure 8:
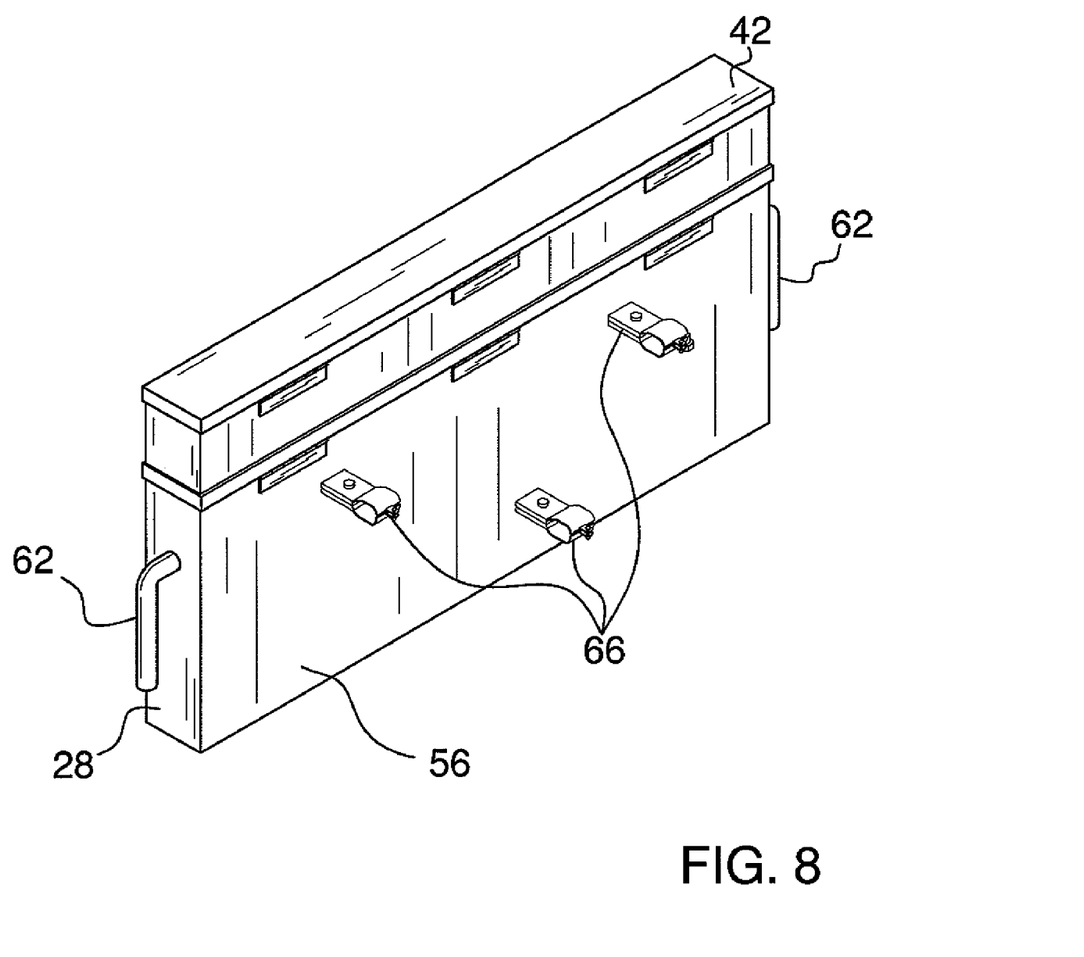
FIG. 8 is a rear perspective view of a third embodiment of the present invention showing alternate forms of brackets.

A pair of brackets 62 is attached to the lower housing 12. The brackets 62 are positioned on opposite sides of the lower housing 12 with respect to each other so that each of the lateral first 26 and second 28 sides has one of the brackets 62 attached thereto. The brackets 62 are inverted L-shaped and can be used to engage the lower housing 12 with a rack of an all terrain vehicle or supported by the side walls of a sports utility vehicle. Alternate types of brackets are found in FIGS. 3 and 8. FIG. 3 includes brackets 64 mounted on the lateral first 26 and second 28 sides that have adjustable width dimensions to engage variously sized elements of racks or other mount receivers. These types of brackets 64 may also be positioned on the back wall 56 of the lower housing 12. FIG. 8 shows brackets 66 which include clamps for extending around a bar or post and which are again attached to the front side 17 of the lower housing 12. The types of brackets 62, 64, 66 used will vary depending on the type of all terrain vehicle the housing is being attached and can be combined as shown in FIG. 8.

Figure 7:
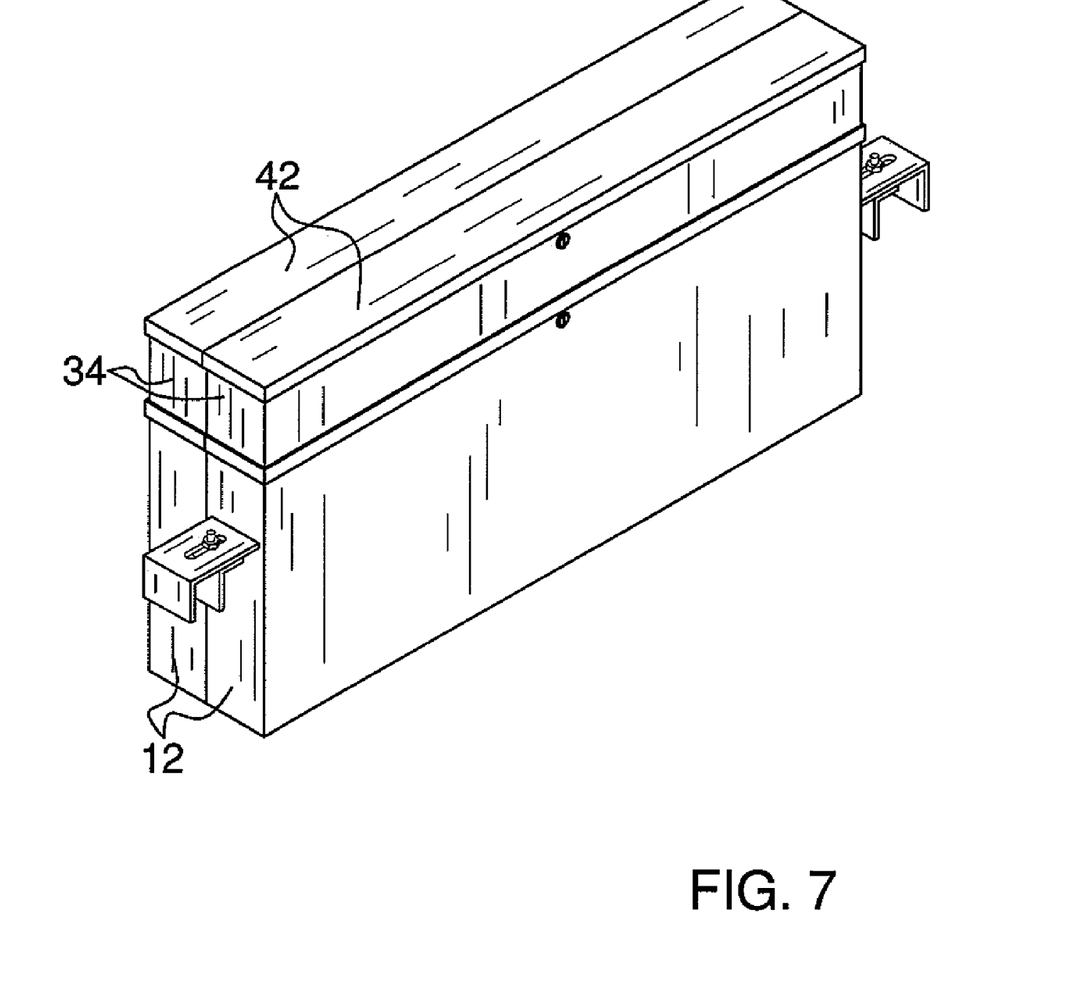
FIG. 7 is a perspective view of a second embodiment of the present invention.

FIG. 7 shows a second embodiment which includes a pair of lower housings 12 attached together and a pair of upper housings 34 attached together. In this embodiment, the upper housings 34 are each mounted on the first cover 30 so that each of the upper housings 34 is lifted away at the same time to access both of the lower housings 12. Each of the upper housings 34 has its own second cover 42. This embodiment allows two bows 20 to be stored at the same time but in a manner that they are separated from each other.

In user, a plurality of arrows 21 is removably positioned in the upper housing 34 and a bow 20 is removably positioned in the lower housing 12. The linings 44, 46 prevent damage to the bow 20 and to the arrows 21 during the transportation thereof.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A storage compartment assembly for storing a plurality of arrows and a bow, said assembly comprising:
    a lower housing having a bottom wall and a peripheral wall being attached to and extending upwardly from said bottom wall, said lower housing having an interior having a size configured to receive a bow, said peripheral wall having an upper edge defining an opening into said interior;
    a first cover being hingedly coupled to said peripheral wall, said first cover being positionable in a closed position extending over said opening or an open position exposing said opening;
    a perimeter wall being attached to and extending upwardly from said first cover, said first cover and said perimeter wall defining an upper housing, said perimeter wall having a top edge defining an aperture into an interior of said upper housing;
    a second cover being hingedly coupled to said perimeter wall, said second cover being positionable in a closed position extending over said aperture or an open position exposing said aperture;
    a pair of brackets, each of said brackets being attached to said lower housing, said brackets being positioned on opposite sides of said lower housing with respect to each other, said housing having a first lateral side and a second lateral side, each of said first and second lateral sides having one of said brackets attached thereto; and
    wherein a plurality of arrows are removably positioned in said upper housing and a bow is removably positioned in said lower housing.

2. The assembly according to claim 1, wherein said upper housing has a height from said first cover to said top edge less than 7 inches.

3. The assembly according to claim 1, further including a first lining being positioned in said lower housing and covering said bottom wall and said peripheral wall, a second lining being positioned in said upper housing and covering said first cover and said perimeter wall, said first and second linings comprising a resiliently compressible material.

4. The assembly according to claim 1, further including:
    a first lock being mounted on said first cover and releasably locking said first cover in said closed position; and
    a second lock being mounted on said second cover and releasably locking said second cover in said closed position.

5. The assembly according to claim 1, a pair of supports being positioned within said lower housing and extending between a front wall and a back wall of said lower housing, said supports being spaced from each other and spaced from said bottom wall, wherein the bow is supported by said supports when the bow is positioned in said lower housing.

6. The assembly according to claim 5, wherein each of said supports has an angled upper surface, said upper surfaces being angled downwardly and toward each other.

7. The assembly according to claim 5, further including a cushioning material being positioned on each of said supports.

8. A storage compartment assembly for storing a plurality of arrows and a bow, said assembly comprising:
    a lower housing having a bottom wall and a peripheral wall being attached to and extending upwardly from said bottom wall, said lower housing having an interior having a size configured to receive a bow, said peripheral wall having an upper edge defining an opening into said interior, said lower housing having a width from a first lateral side to a second lateral side between 54 inches and 57 inches, said lower housing having a height between 19 inches and 22 inches and a depth between 4½ inches and 6 inches;
    a first cover being hingedly coupled to said peripheral wall, said first cover being positionable in a closed position extending over said opening or an open position exposing said opening;
    a perimeter wall being attached to and extending upwardly from said first cover, said first cover and said perimeter wall defining an upper housing, said perimeter wall having a top edge defining an aperture into an interior of said upper housing, said upper housing having a height from said first cover to said top edge less than 7 inches;
    a second cover being hingedly coupled to said perimeter wall, said second cover being positionable in a closed position extending over said aperture or an open position exposing said aperture;

a first lining being positioned in said lower housing and covering said bottom wall and said peripheral wall, a second lining being positioned in said upper housing and covering said first cover and said perimeter wall, said first and second linings comprising a resiliently compressible material;

a first lock being mounted on said first cover and releasably locking said first cover in said closed position;

a second lock being mounted on said second cover and releasably locking said second cover in said closed position;

a pair of supports being positioned within said lower housing and extending between a front wall and a back wall of said lower housing, said supports being spaced from each other and spaced from said bottom wall, each of said supports having an angled upper surface, said upper surfaces being angled downwardly and toward each other, wherein the bow is supported by said supports when the bow is positioned in said lower housing;

a cushioning material being positioned on each of said supports;

a pair of brackets, each of said brackets being attached to said lower housing, said brackets being positioned on opposite sides of said lower housing with respect to each other, each of said first and second lateral sides having one of said brackets attached thereto; and wherein a plurality of arrows are removably positioned in said upper housing and a bow is removably positioned in said lower housing.

* * * * *